Figure 1:
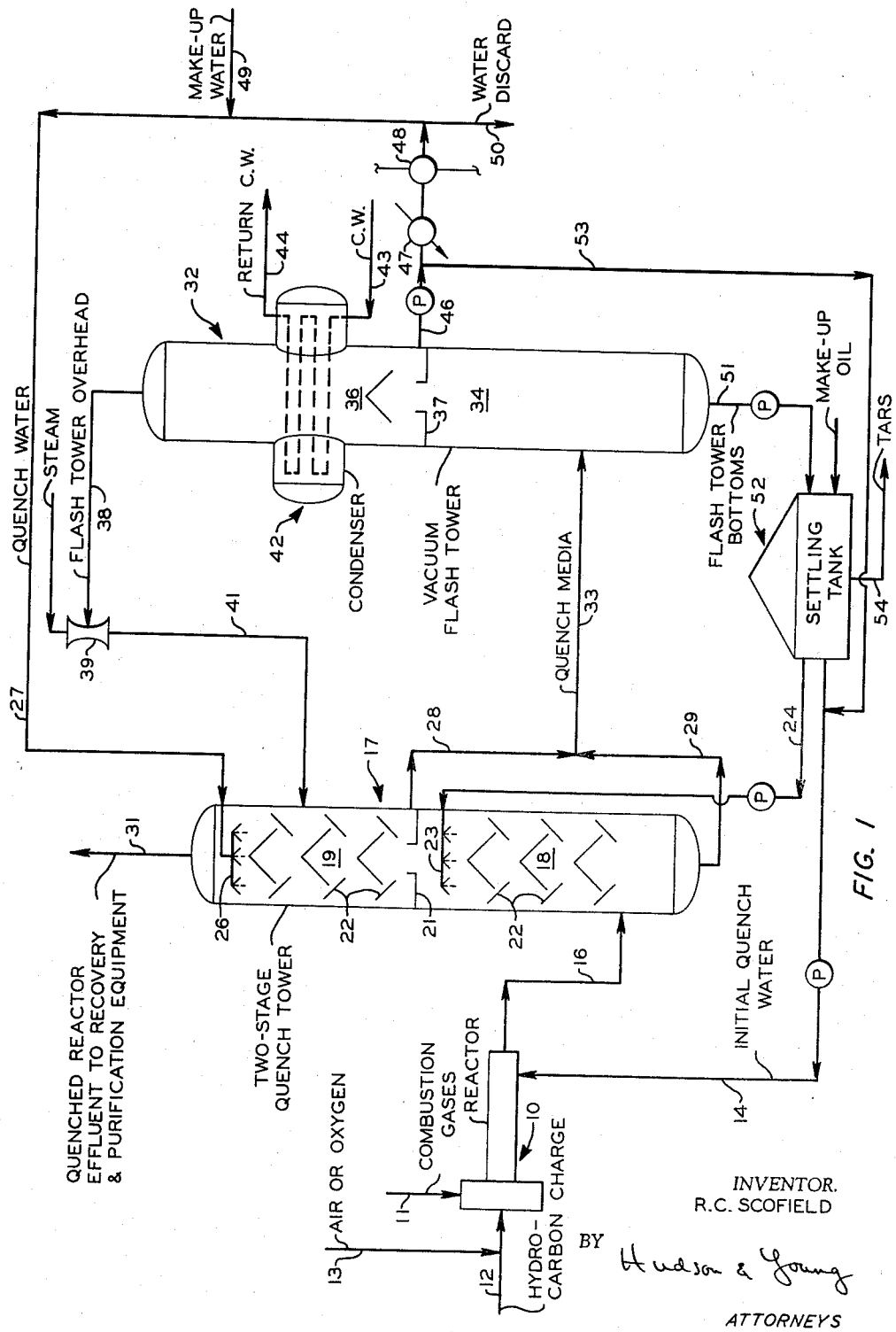

INVENTOR.
R.C. SCOFIELD

INVENTOR.
R.C. SCOFIELD
BY Hudson & Young
ATTORNEYS

United States Patent Office 2,945,075
Patented July 12, 1960

2,945,075
PREPARATION OF REACTOR EFFLUENT FOR RECOVERY OF ACETYLENE AND THE LIKE THEREFROM

Raymond C. Scofield, Bartlesville, Okla., assignor to Phillips Petroleum Company, a corporation of Delaware Filed May 19, 1958, Ser. No. 736,282

16 Claims. (Cl. 260—679)

This invention relates to the manufacture of acetylene, particularly quenching, scrubbing, and cooling hot reactor effluent gases containing acetylene and other valuable cracked products. In one aspect it relates to an improved method and apparatus for preparing low molecular weight cracked gases for recovery and purification of acetylene therefrom. In another aspect it relates to an improved method and apparatus for quenching, scrubbing, and cooling hot acetylene-containing effluent gases obtained from a thermal cracking furnace.

In recent years, increased demand for commercial acetylene has resulted in considerable effort directed toward its production by high temperature cracking of low molecular weight, normally gaseous hydrocarbons, such as methane, ethane, propane, butane, natural gas, and the like, in a thermal cracking furnace. Normally, the hot furnace or reactor effluent gases, containing acetylene and other low molecular weight cracked gases, are subjected to quenching and scrubbing operations to cool the gases, and remove undesirable components such as tars, aromatics, carbon black and condensible vapors. Following the quenching and scrubbing operations, the cracked gases are then compressed, dried, and the acetylene and other valuable cracked products are recovered and purified.

Many of the quenching operations heretofore proposed, patented, or used in commercial operations require a great deal of expensive heat exchange and cooling surface, which surface is often subjected to fog-laden vapors and tar-bearing liquid streams with the result that polymeric materials and other undesirable contaminants often tend to deposit on this surface in such a manner as to reduce the efficiency thereof. Other quench systems require deionized or condensate makeup water, and in many cases require reprocessing of the quench media to remove contaminants, thereby increasing the installation and operational costs. In still other quenching systems the cooled and quenched cracked gases contain prohibitive amounts of undesirable cracked petroluem products, such as tars, etc., as a result of the inefficient scrubbing operation.

Figure 2:
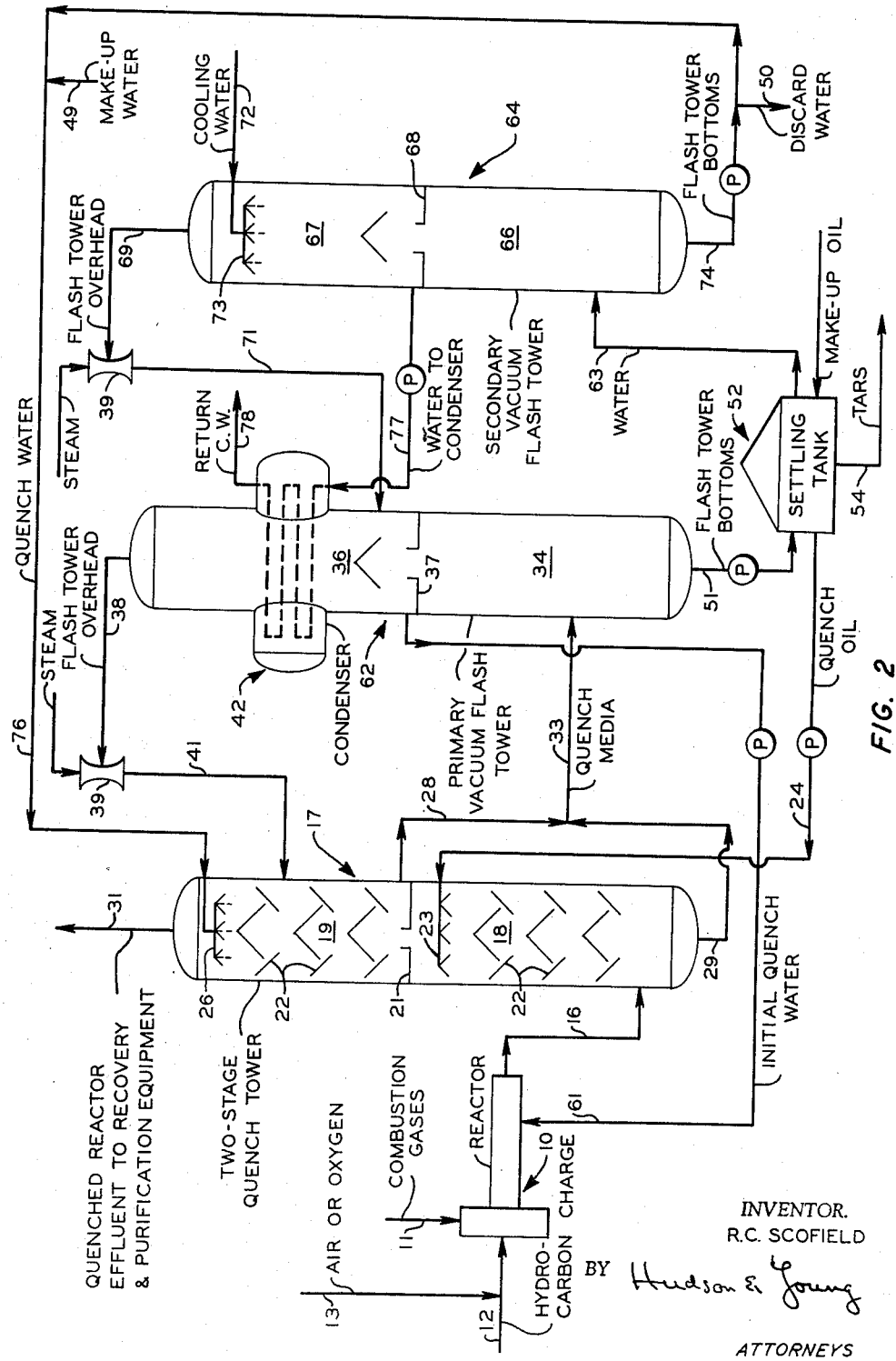

Accordingly, an object of this invention is to overcome the aformentioned problems by the provision of an improved method and apparatus for preparing low molecular weight cracked gases for recovery and purification of valuable cracked products therefrom, such as acetylene. Another object is to provide an improved method and apparatus for quenching, scrubbing, and cooling hot acetylene-containing effluent gases obtained from a thermal cracking furnace. A further object is to provide an improved method and apparatus for quenching effluent gases from a thermal cracking furnace or the like, which method and apparatus are characterized by an efficient and economical heat exchange operation, minimum polymer formation and deposition on the inner walls of processing equipment, and other advantages. Further objects and advantages of this invention will become apparent to those skilled in the art from the following discussion, appended claims and drawing in which:

Figures 1 and 2 are diagrammatic flow sheets illustrating various embodiments of this invention.

Referring now to the drawing, in which like parts have been designated with like reference numerals, and initially to Figure 1, a thermal cracking furnace or reactor generally designated 10 is shown. Reactor 10 is preferably a tangential burner-reactor such as that disclosed and claimed in U.S. Patent 2,750,434, issued June 12, 1956, to Joseph C. Krejci. As disclosed in U.S. Patent 2,750,434, the tangential burner-reactor, or furnace system, contains two cylindrical sections, one of which may be termed a precombustion section, and the other, a reaction section. These two sections are adjacent each other and coaxial, and are preferably disposed horizontally. The combustion section is positioned upstream from the reaction section and ordinarily has a shorter length and a larger diameter as compared to the adjacent disposed reaction section. In Figure 1, a combustible fuel mixture, such as a mixture of natural gas and oxygen, is passed via line 11 into the precombustion chamber of said reactor 10 in a direction tangential to its inner side wall, while at the same time hydrocarbon reactant is axially introduced via line 12 into the combustion section of the furnace, alone or with additional oxygen or air supplied via line 13. The tangentially introduced fuel is burned, upon or prior to entrance into the combustion chamber, and the resulting total hot product of burning, i.e., combustion gases, comes into contact and in direct heat exchange relation with the axially introduced hydrocarbon charge. The tangentially added mixture is injected into the combustion chamber of the furnace at a sufficiently high velocity to cause combustion gases formed therein to flow spirally inward, and subsequently helically downstream through the reaction section. Combustion gases thus formed, together with axially introduced hydrocarbon reactant is passed into the reaction section in an initial state of annular separation. The helically moving combustion gases form a gas blanket adjacent the reactor wall, and in this manner, direct contact of the hydrocarbon reactant with the reaction chamber walls is substantially prevented, and carbon deposition is greatly reduced.

The hydrocarbon reactant or charge can be one of various hydrocarbon cracking stocks, such as methane, ethane, propane, butane, natural gas, and light vaporizable, low molecular weight hydrocarbons. In some cases, it may be desirable to axially introduce the hydrocarbon charge along with steam. The specific reaction temperature used will depend upon the product desired and the hydrocarbon reactant employed. Generally, the reaction temperature employed for the predominant production of olefins will be in the range between about 1300 and 1900° F., and the temperature range for the production of acetylene will be from about 1900 to 3500° F. Within these temperature ranges carbon deposit is greatly minimized or entirely eliminated and light olefininc hydrocarbons, particularly ethylene and propylene, and acetylene are produced and recovered in high yield, together with aromatic hydrocarbons, higher molecular weight olefins and acetylenes, valuable paraffins, and the like, as by-products. The cracking reaction is also accompanied by the formation of tars and other undesirable components and it is necessary to remove these materials as soon as possible from the valuable gaseous products.

Referring now again to Figure 1, at a point immediately downstream of the reaction section of furnace 10 the reactor effluent is initially quenched with water supplied via line 14. Quenching the reactor effluent in this manner limits the reaction time and minimizes decomposition or undesirable reactions of the cracked gases, and to some extent lowers the temperature of the effluent. The reactor effluent and water vapor are then conducted from the furnace 10 via a reactor effluent line 16, the latter preferably being a rather long pipe so that the effluent is in indirect heat exchange with the atmosphere to effect further cooling of the reactor effluent.

The reactor effluent, having a temperature between about 470 and 800° F., is passed via pipe 16 to a vertically disposed two-stage quench and scrubbing tower generally designated 17, and introduced in the bottom section thereof. Quench tower 17 is divided into a lower quench section 18 and an upper quench section 19 by an intermediate liquid take-off tray 21, such as a doughnut tray. The lower and upper quench sections 18, 19 are provided with vapor-liquid contacting means generally designated 22, which may be baffles, bubble cap trays, Schneible trays, or the like. The reactor effluent gases flow upwardly in the lower quench section 18 in countercurrent relation to quench oil, such as mineral seal oil, sprayed by means 23 in the upper end thereof, the quench oil, having a temperature between about 130 and 190° F., being supplied to the quench tower via line 24. The direct contact of the reactor effluent with the quench oil results in some further cooling of the reactor effluent, e.g., to a temperature between about 150 and 205° F., and results in scrubbing the effluent to effect the removal of tars and aromatic components therefrom. The partially cooled reactor effluent gases then flow upwardly through the upper quench section 19 in countercurrent relation with quench water that is sprayed by means 26 in the upper end thereof, the quench water, having a temperature between about 85° to 105° F., being supplied to the tower via line 27. Upon direct contact of the reactor effluent gases with the quench water, additional cooling is effected and condensable vapors removed from said effluent. The major portion of the liquid condensate accumulated on tray 21, having a temperature between about 150 and 195° F., is removed from the upper quench section 19 by means of condensate withdrawal line 28. The spent oil quench media, having a temperature between about 305 and 390° F. and containing absorbed tars and aromatics, is withdrawn from the lower end of the lower quench section 18 by means of withdrawal line 29. The quenched and scrubbed reactor effluent gases, having a temperature between about 95 and 165° F., are removed from the upper end of quench tower 17 via conduit 31 and are then subsequently compressed and further cooled and passed to recovery and purification equipment, such as that disclosed and claimed in U.S. Patent 2,814,359, issued November 26, 1957, to R. A. Koble.

The quench media in withdrawal lines 28, 29 is then conveyed to a vacuum flash tower generally designated 32 via line 33. Flash tower 32 is preferably intermediately divided into a lower section 34 and upper section 36 by means of a liquid take-off tray 37, such as a doughnut tray. The flash tower 32 is maintained under a sub-atmospheric pressure or vacuum by suitable means. For example, the upper end of the flash tower 32 communicates with a line 38 so as to permit the withdrawal of overhead, which line is connected to a suitable steam jet ejector generally designated 39, the overhead being thus conveyed via line 41 to the upper section 19 of quench tower 17. The quench media from quench tower 17 is cooled by passing it via line 33 into the lower flash tower section 34 with the result that a minor portion of the quench water is immediately flashed, the major portion of quench water and the oil settling in the tower bottom. The water vapor from the flashed quench media passes upwardly into the upper flash section 36 and the major portion thereof is cooled and condensed upon contact with the cooled condenser surfaces of a condenser generally designated 42 which is disposed within the upper flash tower section 36, said condenser being supplied with cooling water via line 43, which is returned via line 44.

The condensate accumulating on the take-off tray 37 is withdrawn via line 46 and pumped to a suitable heat exchanger 47 where the water is further cooled, and subsequently passed to a refrigerant exchanger 48 where it is further cooled, the resultant cooled water then being returned via line 27 to the spray means 26 in the upper end of the quench tower 17. The quench water in line 27 can be supplemented when desired by the addition of make-up water supplied via line 49, and a small amount of water containing dissolved solids discarded via line 50. Alternatively, the condensate on tray 37 can be pumped back to the reactor 10 via lines 53, 14 to initially quench the reactor effluent.

The flash tower bottoms, generally comprising five times as much water as oil by weight, and having a temperature between about 137 to 146° F., are removed from the lower end of flash tower 32 via withdrawal line 51 and pumped to a suitable liquid separation zone generally designated 52, such as a cone-roof settling tank. The quench oil utilized in quench tower 17 is supplied from settling tank 52, the quench oil being pumped and conveyed via line 24 to the spray means 23 of the quench tower 17. The water required for the initial quench of the reactor effluent can be supplied and pumped from settling tank 52 via line 14, this water being supplemented when necessary by condensate from the flash tower 32 via line 53. Alternatively, water can be withdrawn from settling tank 52 and cooled by an indirect heat exchanger to 95° F. and conveyed to the spraying means 26 in the upper portion of quench tower 17. Tars and other contaminants can be removed from settling tank 52 via withdrawal line 54.

Referring now to Figure 2, another embodiment of this invention is shown which in some respects is similar to that shown in Figure 1. In Figure 2 the water required for the initial quench of the reactor effluent is supplied and pumped via line 61 from the liquid take-off tray 37 of a primary vacuum flash tower 62 which in some aspects is similar to vacuum flash tower 32 of Figure 1. The water from the settling tank 52 of Figure 2, at a temperature of about 141° F., is supplied and pumped via line 63 to a secondary flash tower generally designated 64 where it is further cooled by evaporation to about 95° F. This flash tower is in some respects similar to the primary flash tower 62 in that it is intermediately divided into a lower flash section 66 and upper flash section 67 by a liquid take-off tray 68. The secondary flash tower 64 is also maintained at sub-atmospheric pressure or vacuum by means similar to that utilized in maintaining the primary vacuum flash tower 62 under vacuum. However, the flash tower overhead from the secondary vacuum flash tower 64 is conveyed via lines 69 and 71 to the upper section 36 of the primary vacuum flash tower 62. In addition, cooling water is supplied via line 72 to spray means 73 in the upper section 67 of the secondary flash tower 64 so as to condense the water vapor resulting from the flashing operation. The flash tower bottoms from the secondary flash tower 64 are withdrawn via line 74 and pumped via line 76 back to the spray means 26 in the upper quench section 19 of the two-stage quench tower 17. Water evaporated in flash tower 64 is preferably replaced by fresh treated cooling tower make-up water supplied via line 49 in 10 percent excess amount, which amount offsets the water discarded via line 50 to limit the build-up of dissolved solids. The condensate accumulating in the take-off tray 68 of the secondary vacuum flash tower 64 is withdrawn and pumped via line 77 to the condenser 42 disposed within the upper section 36 of the primary vacuum flash tower 62, cooling water being returned from the condenser via line 78.

The advantages obtained by the practice of this invention are manyfold. Particularly, it is to be noted that the very hot effluent gases issuing from the reactor exit are initially quenched with oil rather than water. As a result, the bulk of tars and other undesirable components are removed from the reactor effluent at a high temperature level by absorption in the quench oil. Were water to be used for quenching these hot gases, the water would be immediately flashed, generating large quantities of steam which would tend to carry overhead prohibitive amounts of tars and other contaminants, necessitating a large investment in heat exchange surface and further operations to remove these contaminants from the effluent stream. Moreover, such an initial water quench would rely on mechanical contact and condensation to effect removal of contaminants, whereas the initial oil quench relies on absorption of these contaminants by the oil. The effective removal of tars, etc., by the practice of this invention, which utilizes to advantage a closed quench system, permits drying and acetylene absorption to be carried out without a prior deoiling step and, in turn, allows heavy actylenes to be removed from the relatively small acetylene product stream, rather than from the total cracked stream.

The water quench media is cooled by the practice of this invention by utilizing its latent heat of vaporization under sub-atmospheric pressure. Further, heat exchange surface is not exposed to fog-laden vapors or tar-bearing liquid streams.

The operation of the above-described equipment according to the practice of this invention will now be described, and it should be realized that certain apparatus, such as valves, flow controllers, ratio flow controllers, meters, pressure indicating and recording equipment, temperature indicating and recording equipment, and the like, are provided at proper process points for maintaining proper control of the processes of this invention, such equipment, their installation and use being well understood by those skilled in the processing art.

Referring again to Figure 1, 9,267 mols/s.d. of hydrocarbon charge stock prepared by preheating a mixture of 5,948 mols/s.d. of a butane feed, containing a small amount of butylenes and other unsaturates, is thermally cracked within reactor 10 at a reaction temperature of about 2500° F. The reactor products are initially quenched by spraying 41,800 mols/s.d. of water within the downstream end of reactor 10, the temperature of the reactor effluent being lowered to about 1200° F. The resultant effluent-steam mixture is then conducted from reactor 10 via line 16, the latter being preferably in heat exchange relation with the atmosphere so as to effect cooling of the gases to a temperature of about 600° F., at a rate of about 131,780 mols/s.d., of which 52,672 mols/s.d. is water. Quench oil, such as mineral seal oil, having a temperature of about 141° F., is sprayed into the upper end of the lower quench section 18 at a rate of about 22,936 mols/s.d. The resulting quenching and scrubbing of the gases results in the removal of a large proportion of tars, heavy olefinic hydrocarbon, aromatics and other contaminants which are absorbed in the quench oil, thus resulting in cooling these gases to a temperature of about 176° F. The reactor effluent gases then flow upwardly through the upper quench section 19 in countercurrent relation with quench water sprayed into the upper end thereof, this quench water having a temperature of about 95° F. and sprayed at a rate of about 7,090 mols/s.d. As a result of this direct contact, residual amounts of tars and other contaminants are removed from the gases, the resulting quenched, scrubbed, and cooled gases being removed as overhead from the quench tower 17 at a temperature of about 100° F. The overhead gaseous product, amounting to 84,363 mols/s.d., is then directed to the recovery and purification train, the gaseous product having the following composition:

| | Mols/s.d. |
|---|---|
| $CO$ | 3,650 |
| $CO_2$ | 4,500 |
| $N_2$ | 44,150 |
| $H_2$ | 14,370 |
| $CH_4$ | 4,410 |
| $C_2H_2$ | 5,950 |
| $C_2H_4$ | 1,659 |
| $C_3H_4$ | 119 |
| $C_4H_2$ | 200 |
| $C_4H_4$ | 100 |
| Oil | 5 |
| Water | 5,250 |

Liquid condensate is withdrawn from take-off tray 21 via line 28 at a temperature of about 160° F. and at a rate of about 837,603 mols/s.d., of which 131 mols/s.d. is oil, the remainder water. The spent oil quench media, containing the absorbed contaminants, is withdrawn from the lower portion of tower 17 via line 29 at a temperature of about 350° F. and at a rate of 22,800 mols/s.d. The combined streams of liquid condensate and spent quench oil is conveyed via line 33 to the flash tower 32, the latter having a pressure of about 155 mm. Hg, wherein the quench media is immediately flashed. Flash tower 32 is maintained under a vacuum by passing overhead amounting to 6 mols/s.d. via line 38 to steam jet ejector 39, the latter being supplied with 34 pounds per hour steam, the resultant overhead-steam mixture being passed via line 41 to the upper portion of the quench tower 17. In the upper portion 36 of the flash tower 32, flash vapors are condensed on condenser surfaces of condenser 42, the latter being supplied with cooling water at a temperature of about 85° F., this condenser having about 8,500 ft.² The flash tower bottoms are removed from the lower end of the flash tower 17 via line 51, at a rate of 795,667 mols/s.d., and pumped to settling tank 52, the temperature of the latter being about 141° F. The water is withdrawn from settling tank 52 and pumped via line 14 to the downstream end of reactor 10 at a temperature of about 141° F. and at a rate of about 41,800 mols/s.d. Alternatively, the condensate accumulated on tray 37 can be withdrawn from the flash tower 32 and pumped back to the reactor 10 to initially quench the effluent gases. The condensate accumulated on tray 37 can also be withdrawn via lines 46, 27 to the upper end of the quench tower 17. Alternatively, water can be withdrawn from settling tank 52 and passed to a suitable heat exchanger to effect cooling to 95° F. and then sprayed in the upper end of quench tower 17.

The quench oil employed in the practice of this invention is substantially any heavy oil, paraffinic or aromatic, which will flow and can be sprayed at the lowest temperatures involved. Oils which are preferably employed include benzene, toluene, anthracene, predominantly aromatic kerosenes having, for example, a boiling point in the range of 200° F. to 500° F., and predominantly aromatic gas oil, such as a gas oil having a boiling range of 400° F. to 700° F. A preferred oil is a heavy aromatic oil which is produced in the cracking operation and permitted to accumulate in the process. A suitable oil which can be used for quenching according to this invention has the following specification:

Specific gravity at 60/60° F.=1.0655
Kinematic viscosity at 100° F.=14.38 centistokes
Kinematic viscosity at 210° F.=2.86 centistokes
Bureau of Mines Correlation Index=133
ASTM distillation, corrected to 760 mm. Hg.

| Percent: | ° F. |
|---|---|
| 5 | 413 |
| 10 | 428 |
| 20 | 450 |
| 30 | 479 |
| 40 | 515 |
| 50 | 558 |

Various modifications and alterations of this invention become apparent to those skilled in the art without departing from the scope and spirit of this invention, and it is to be understood that the latter is not to be limited to the foregoing discussion and accompanying drawing illustrating preferred embodiments of this invention.

I claim:

1. A process for quenching and scrubbing a high temperature cracked gas containing acetylene recovered from the thermal conversion of hydrocarbons to produce acetylene, which comprises passing said high temperature cracked gas into the lower portion of a two-stage quenching zone; initially contacting said cracked gas in the lower portion of said quenching zone with relatively cooler quench oil in countercurrent flow; finally contacting said cracked gas with quench water in the upper portion of said quenching zone in countercurrent flow; withdrawing the resulting quenched, relatively tar-free cracked gas containing acetylene as overhead from said upper portion of said quenching zone; withdrawing liquid condensate from said upper portion of said quenching zone; withdrawing spent oil from said lower portion of said quenching zone; passing said liquid condensate and spent oil to the lower portion of a sub-atmospheric flashing zone to effect evaporation of a minor portion of said liquid condensate and cause said spent oil and a major portion of said liquid condensate to settle in the lower portion of said flashing zone; condensing the resulting water vapor in the upper portion of said flashing zone; withdrawing water and said settled spent oil from said lower portion of said flashing zone and conveying the same to a liquid separation zone; withdrawing oil from the latter zone and passing the same to the upper end of said lower portion of said quenching zone for use as said quench oil; collecting liquid condensate accumulating in the lower end of said upper portion of said flashing zone; and withdrawing said last-mentioned condensate from said flashing zone for use as quench media in the system.

2. In a process for manufacturing acetylene by the thermal conversion of a gaseous hydrocarbon in a thermal reactor, wherein a high temperature cracked gas comprising acetylene, olefins, higher acetylenes and olefins, aromatics, and tars, is initially quenched with water introduced in the downstream end of said furnace, the steps comprising passing said high temperature cracked gas having a temperature in the range of 470 to 800° F. into the lower portion of a two-stage quenching zone; initially contacting said cracked gas in the lower portion of said quenching zone with relatively cooler quench oil having a temperature in the range of 130 and 190° F. in countercurrent flow; finally contacting said cracked gas with quench water having a temperature in the range of 85 to 105° F. in the upper portion of said quenching zone in countercurrent flow; withdrawing the resulting quenched, relatively tar-free cracked gas as overhead from said upper portion of said quenching zone; withdrawing liquid condensate from said upper portion of said quenching zone; withdrawing spent oil from said lower portion of said quenching zone; passing said liquid condensate and spent oil to the lower portion of a sub-atmospheric flashing zone to effect evaporation of said liquid condensate and cause said spent oil to settle in the lower portion of said flashing zone; condensing the resulting water vapor in the upper portion of said flashing zone; withdrawing said settled spent oil from said lower portion of said flashing zone and conveying the same to a liquid separation zone; withdrawing oil from the latter zone and passing the same to the upper end of said lower portion of said quenching zone for use as said quench oil; collecting liquid condensate accumulating in the lower end of said upper portion of said flashing zone; and passing said accumulated liquid condensate back to the system for use as quench media.

3. In a process according to claim 2 wherein said last-mentioned liquid condensate is cooled and returned to said upper portion of said quenching zone for use as said quench water, and wherein water is withdrawn from said liquid separation zone and returned to said downstream end of said furnace to initially quench said reactor effluent.

4. In a process according to claim 2 wherein a major portion of said last-mentioned accumulated liquid condensate is cooled and returned to said upper portion of said quenching zone for use as said quench water, and a minor portion of said accumulated liquid condensate together with water withdrawn from said liquid separation zone is returned to said downstream end of said furnace to initially quench said reactor effluent.

5. In a process according to claim 2 wherein said last-mentioned accumulated liquid condensate is returned to said downstream end of said reactor to initially quench said reactor effluent; and wherein water is withdrawn from said separation zone, cooled, and returned to said upper portion of said quenching zone to serve as said quench water.

6. In a process for manufacturing acetylene by the thermal conversion of a gaseous hydrocarbon in a thermal reactor, wherein a high temperature cracked gas comprising acetylene, olefins, higher acetylenes and olefins, aromatics, and tars, is initially quenched with water introduced in the downstream end of said furnace, the steps comprising passing said high temperature cracked gas having a temperature in the range of 470 to 800° F. into the lower portion of a two-stage quenching zone; initially contacting said cracked gas in the lower portion of said quenching zone with relatively cooler quench oil having a temperature in the range of 130 and 190° F. in countercurrent flow; finally contacting said cracked gas with quench water having a temperature in the range of 85 to 105° F. in the upper portion of said quenching zone in countercurrent flow; withdrawing the resulting quenched, relatively tar-free cracked gas as overhead from said upper portion of said quenching zone; withdrawing liquid condensate from said upper portion of said quenching zone; withdrawing spent oil from said lower portion of said quenching zone; passing said liquid condensate and spent oil to the lower portion of a sub-atmospheric flashing zone to effect evaporation of said liquid condensate and cause said spent oil to settle in the lower portion of said flashing zone; condensing the resulting water vapor in the upper portion of said flashing zone; withdrawing said settled spent oil from said lower portion of said flashing zone and conveying the same to a liquid separation zone; withdrawing oil from the latter zone and passing the same to the upper end of said lower portion of said quenching zone for use as said quench oil; collecting liquid condensate accumulating in the lower end of said upper portion of said flashing zone; withdrawing said condensate from said flashing zone and cooling the same; passing the resulting cooled condensate back to said upper portion of said quenching zone for use as said quench water; and withdrawing water from said liquid separation zone and returning the same to the downstream end of said reactor so as to preliminarily quench said reactor effluent.

7. In a process according to claim 6 wherein a portion of said condensate from said flashing tower is also returned to said downstream end of said reactor.

8. In a process for manufacturing acetylene by the thermal conversion of a gaseous hydrocarbon in a thermal reactor, wherein a high temperature cracked gas comprising acetylene, olefins, higher acetylenes and olefins, aromatics, and tars, is initially quenched with water introduced in the downstream end of said furnace, the steps comprising passing said high temperature cracked gas having a temperature in the range of 470 to 800° F. into the lower portion of a two-stage quenching zone; initially contacting said cracked gas in the lower portion of said quenching zone with relatively cooler quench oil having a temperature in the range of 130 and 190° F. in countercurrent flow; finally contacting said cracked gas with quench water having a temperature in the range of 85 to 105° F. in the upper portion of said quenching zone in countercurrent flow; withdrawing the resulting quenched, relatively tar-free cracked gas as overhead from said upper portion of said quenching zone; withdrawing liquid condensate from said upper portion of said quenching zone; withdrawing spent oil from said lower portion of said quenching zone; passing said liquid condensate and spent oil to the lower portion of a sub-atmospheric flashing zone to effect evaporation of said liquid condensate and cause said spent oil to settle in the lower portion of said flashing zone; condensing the resulting water vapor in the upper portion of said flashing zone; withdrawing said settled spent oil from said lower portion of said flashing zone and conveying the same to a liquid separation zone; withdrawing oil from the latter zone and passing the same to the upper end of said lower portion of said quenching zone for use as said quench oil; collecting liquid condensate accumulating in the lower end of said upper portion of said flashing zone; withdrawing said condensate from said flashing zone and passing the same back to the downstream end of said reactor so as to preliminarily quench said reactor effluent; withdrawing water from said liquid separation zone and cooling the same; and passing the resulting cooled water back to said upper portion of said quenching zone for use as said quench water.

9. In a process for manufacturing acetylene by the thermal conversion of a gaseous hydrocarbon in a thermal reactor, wherein a high temperature cracked gas comprising acetylene, olefins, higher acetylenes and olefins, aromatics, and tars, is initially quenched with water introduced in the downstream end of said furnace, the steps comprising passing said high temperature cracked gas having a temperature in the range of 470 to 800° F. into the lower portion of a two-stage quenching zone; initially contacting said cracked gas in the lower portion of said quenching zone with relatively cooler quench oil having a temperature in the range of 130 and 190° F. in countercurrent flow; finally contacting said cracked gas with quench water having a temperature in the range of 85 to 105° F. in the upper portion of said quenching zone in countercurrent flow; withdrawing the resulting quenched, relatively tar-free cracked gas as overhead from said upper portion of said quenching zone; withdrawing liquid condensate from said upper portion of said quenching zone; withdrawing spent oil from said lower portion of said quenching zone; passing said liquid condensate and spent oil to the lower portion of a sub-atmospheric flashing zone to effect evaporation of said liquid condensate and cause said spent oil to settle in the lower portion of said flashing zone; condensing the resulting water vapor in the upper portion of said flashing zone; withdrawing said settled spent oil from said lower portion of said flashing zone and conveying the same to a liquid separation zone; withdrawing oil from the latter zone and passing the same to the upper end of said lower portion of said quenching zone for use as said quench oil; collecting liquid condensate accumulating in the lower end of said upper portion of said flashing zone; withdrawing said condensate from said flashing zone and passing the same back to the downstream end of said reactor so as to preliminarily quench said reactor effluent; withdrawing water from said liquid separation zone and passing the same to the lower portion of a second similar sub-atmospheric flashing zone to effect evaporation of said water; passing relatively cooler water into the upper portion of said second flashing zone to effect condensation of the resulting water vapor; collecting the resulting accumulated condensate in the upper portion of said second flashing zone; withdrawing said accumulated condensate and passing the same to said upper portion of said first flashing zone; and withdrawing accumulated condensate in the lower portion of said second flashing zone and passing the same back to said upper portion of said quenching zone for use as said quench water.

10. Apparatus for quenching and scrubbing a gas recovered from the thermal conversion of hydrocarbons from a thermal reactor, which comprises, in combinatoin; a two-stage gas-liquid contact tower intermediately divided by liquid collecting means, having a gas passage therein, into lower and upper quenching zones; gas-inlet means in the lower part of said lower quenching zone; gas-outlet means in the upper part of said upper quenching zone; first liquid inlet means in the upper end of said lower quenching zone; second liquid inlet means in the upper end of said upper quenching zone; first liquid withdrawal outlet means in the lower end of said lower quenching zone; second liquid withdrawal outlet means in the lower end of said upper quenching zone and adapted to withdraw liquid from said liquid collecting means; first conduit means operatively connected to first and second liquid withdrawal outlet means; a sub-atmospheric flash tower intermediately divided by liquid collecting means into and upper and lower zones; liquid inlet means in the lower part of said lower zone of said flash tower and operatively connected to said first conduit means; an indirect heat exchanger disposed in said upper zone of said flash tower; third liquid withdrawal outlet means in the lower end of said lower zone of said flash tower; fourth liquid withdrawal outlet means in the lower end of said upper zone of said flash tower and operatively adapted to withdraw liquid from said last-mentioned liquid collecting means; second conduit means operatively connected to said third liquid withdrawal outlet means; a liquid settling tank operatively connected to said last-mentioned conduit means; third conduit means operatively connected to said settling tank and said first liquid inlet means and adapted to supply the same with quench media; and means operatively connected to said fourth liquid withdrawal outlet means and adapted to return quench media therefrom to the system.

11. Apparatus according to claim 10 wherein said last-mentioned means comprises fourth conduit means operatively connected to said fourth liquid withdrawal outlet means and indirect heat exchange cooling means, and fifth conduit means operatively connected to the latter and said second liquid inlet means in the upper end of said contact tower; and wherein said apparatus further comprises sixth conduit means operatively connected to said settling tank and the downstream end of said reactor and adapted to supply water quench media thereto.

12. Apparatus according to claim 11 further comprising fifth conduit means operatively connected between said fourth and sixth conduit means and adapted to withdraw a portion of said liquid condensate from the former and supply it to the latter.

13. Apparatus according to claim 10 wherein said last-mentioned means comprises fourth conduit means operatively connected to said fourth liquid withdrawal outlet means and the downstream end of said reactor and adapted to supply the latter with said liquid condensate; and wherein said apparatus further comprises fifth conduit means operatively connected to said settling tank and adapted to withdraw quench water from the latter and supply the same to a direct heat exchanger wherein said quench water is cooled; and sixth conduit means operatively connected to the latter heat exchanger and said second liquid inlet means in said upper end of said contact tower.

14. Apparatus for quenching and scrubbing a gas recovered from the thermal conversion of hydrocarbons from a thermal reactor, which comprises, in combination; a two-stage gas-liquid contact tower intermediately divided by liquid collecting means, having a gas passage therein, into lower and upper quenching zones; gas-inlet means in the lower part of said lower quenching zone; gas-outlet means in the upper part of said upper quenching zone; first liquid inlet means in the upper end of said lower quenching zone; second liquid inlet means in the upper end of said upper quenching zone; first liquid withdrawal outlet means in the lower end of said lower quenching zone; second liquid withdrawal outlet means in the lower end of said upper quenching zone and adapted to withdraw liquid from said liquid collecting means; first conduit means operatively connected to first and second liquid withdrawal outlet means; a sub-atmospheric flash tower intermediately divided by liquid collecting means into upper and lower zones; liquid inlet means in the lower part of said lower zone of said flash tower and operatively connected to said first conduit means; an indirect heat exchanger disposed in said upper zone of said flash tower; third liquid withdrawal outlet means in the lower end of said lower zone of said flash tower; fourth liquid withdrawal outlet means in the lower end of said upper zone of said flash tower and operatively adapted to withdraw liquid from said last-mentioned liquid collecting means; second conduit means operatively connected to said third liquid withdrawal outlet means; a liquid settling tank operatively connected to said last-mentioned conduit means; third conduit means operatively connected to said settling tank and said first liquid inlet means and adapted to supply the same with quench media; fourth conduit means operatively connected to said fourth liquid withdrawal outlet means; indirect heat exchange cooling means operatively connected to said fourth conduit means; fifth conduit means operatively connected to said last-mentioned indirect heat exchange cooling means and operatively adapted to pass cooled liquid therefrom back to said second liquid inlet means in the upper end of said contact tower; and sixth conduit means operatively connected to said settling tank and adapted to pass quench water therefrom to the downstream end of said reactor.

15. Apparatus for quenching and scrubbing a gas recovered from the thermal conversion of hydrocarbons from a thermal reactor, which comprises, in combination; a two-stage gas-liquid contact tower intermediately divided by liquid collecting means, having a gas passage therein, into lower and upper quenching zones; gas-inlet means in the lower part of said lower quenching zone; gas-outlet means in the upper part of said upper quenching zone; first liquid inlet means in the upper end of said lower quenching zone; second liquid inlet means in the upper end of said upper quenching zone; first liquid withdrawal outlet means in the lower end of said lower quenching zone; second liquid withdrawal outlet means in the lower end of said upper quenching zone and adapted to withdraw liquid from said liquid collecting means; first conduit means operatively connected to first and second liquid withdrawal outlet means; a sub-atmospheric flash tower intermediately divided by liquid collecting means into upper and lower zones; liquid inlet means in the lower part of said lower zone of said flash tower and operatively connected to said first conduit means; an indirect heat exchanger disposed in said upper zone of said flash tower; third liquid withdrawal outlet means in the lower end of said lower zone of said flash tower; fourth liquid withdrawal outlet means in the lower end of said upper zone of said flash tower and operatively adapted to withdraw liquid from said last-mentioned liquid collecting means; second conduit means operatively connected to said third liquid withdrawal outlet means; a liquid settling tank operatively connected to said last-mentioned conduit means; third conduit means operatively connected to said settling tank and said first liquid inlet means and adapted to supply the same with quench media; fourth conduit means operatively connected to said fourth liquid withdrawal outlet means and adapted to pass condensate therefrom back to the downstream end of said reactor; fifth conduit means operatively connected to said settling tank and adapted to pass water therefrom to direct heat exchange cooling means; and sixth conduit means operatively connected to said last-mentioned direct heat exchange cooling means and adapted to pass the resulting cooled water therefrom back to said second liquid inlet means in said upper end of said contact tower.

16. Apparatus for quenching and scrubbing a gas recovered from the thermal conversion of hydrocarbons from a thermal reactor, which comprises, in combination; a two-stage gas-liquid contact tower intermediately divided by liquid collecting means, having a gas passage therein, into lower and upper quenching zones; gas-inlet means in the lower part of said lower quenching zone; gas-outlet means in the upper part of said upper quenching zone; first liquid inlet means in the upper end of said lower quenching zone; second liquid inlet means in the upper end of said upper quenching zone; first liquid withdrawal outlet means in the lower end of said lower quenching zone; second liquid withdrawal outlet means in the lower end of said upper quenching zone and adapted to withdraw liquid from said liquid collecting means; first conduit means operatively connected to first and second liquid withdrawal outlet means; a sub-atmospheric flash tower intermediately divided by liquid collecting means into upper and lower zones; liquid inlet means in the lower part of said lower zone of said flash tower and operatively connected to said first conduit means; an indirect heat exchanger disposed in said upper zone of said flash tower; third liquid withdrawal outlet means in the lower end of said lower zone of said flash tower; fourth liquid withdrawal outlet means in the lower end of said upper zone of said flash tower and operatively adapted to withdraw liquid from said last-mentioned liquid collecting means; second conduit means operatively connected to said third liquid withdrawal outlet means; a liquid settling tank operatively connected to said last-mentioned conduit means; third conduit means operatively connected to said settling tank and said first liquid inlet means and adapted to supply the same with quench media; fourth conduit means operatively connected to said fourth liquid withdrawal outlet means and adapted to pass condensate therefrom back to the downstream end of said reactor; fifth conduit means operatively connected to said settling tank and adapted to withdraw water therefrom; a second similar sub-atmospheric flash tower; third liquid inlet means in the lower portion of said second flash tower and operatively connected to said fifth conduit means; fourth liquid inlet means in the upper portion of said second flash tower; condensate collecting means in said upper portion of said second flash tower; sixth conduit means operatively adapted to withdraw accumulated condensate from said last-mentioned collecting means and supply the same to said condenser in said upper zone of said first flash tower; and seventh conduit means operatively adapted to withdraw condensate from the lower part of said second flash tower and pass the same to said second liquid inlet means.

References Cited in the file of this patent

UNITED STATES PATENTS

| | | |
|---|---|---|
| 2,322,056 | Potts | June 15, 1943 |
| 2,416,227 | Seyfried | Feb. 18, 1947 |
| 2,722,506 | Ellis | Nov. 1, 1955 |

UNITED STATES PATENT OFFICE

CERTIFICATE OF CORRECTION

Patent No. 2,945,075                         July 12, 1960

Raymond C. Scofield

It is hereby certified that error appears in the printed specification of the above numbered patent requiring correction and that the said Letters Patent should read as corrected below.

Column 10, line 19, strike out "and", first occurrence.

Signed and sealed this 4th day of April 1961.

(SEAL)
Attest: ERNEST W. SWIDER

Attesting Officer

ARTHUR W. CROCKER
Acting Commissioner of Patents